United States Patent
Hayashi et al.

(10) Patent No.: US 7,869,532 B2
(45) Date of Patent: Jan. 11, 2011

(54) CELLULAR COMMUNICATION SYSTEM AND A METHOD OF OPERATION THEREFOR

(75) Inventors: Hiroshi Hayashi, Koganei (JP); Noriyuki Nakai, Yokohama (JP)

(73) Assignee: Motorola Mobility, Inc., Libertyville, IL (US)

( * ) Notice: Subject to any disclaimer, the term of this patent is extended or adjusted under 35 U.S.C. 154(b) by 733 days.

(21) Appl. No.: 11/849,444

(22) Filed: Sep. 4, 2007

(65) Prior Publication Data
US 2009/0060003 A1   Mar. 5, 2009

(51) Int. Cl.
H04L 27/28   (2006.01)

(52) U.S. Cl. .................. 375/260; 375/259; 375/261; 375/267; 375/130; 375/139; 455/59

(58) Field of Classification Search .................. 375/259, 375/260, 261, 267, 130, 139, 146; 455/59
See application file for complete search history.

(56) References Cited

U.S. PATENT DOCUMENTS

| | | | | |
|---|---|---|---|---|
| 7,693,031 | B2* | 4/2010 | Yang et al. | 370/203 |
| 7,701,919 | B2* | 4/2010 | Ah Lee | 370/344 |
| 2005/0226140 | A1 | 10/2005 | Zhuang et al. | |
| 2006/0009227 | A1* | 1/2006 | Cudak et al. | 455/450 |
| 2006/0039451 | A1 | 2/2006 | Zhuang et al. | |
| 2006/0056373 | A1 | 3/2006 | Legg | |
| 2006/0291431 | A1* | 12/2006 | Pajukoski et al. | 370/335 |
| 2007/0165588 | A1* | 7/2007 | McCoy | 370/344 |
| 2007/0183307 | A1 | 8/2007 | Akita et al. | |
| 2007/0190967 | A1* | 8/2007 | Cho et al. | 455/403 |
| 2007/0217440 | A1* | 9/2007 | Cho et al. | 370/431 |
| 2007/0291696 | A1* | 12/2007 | Zhang et al. | 370/331 |
| 2007/0297381 | A1* | 12/2007 | Oketani et al. | 370/338 |
| 2008/0031186 | A1* | 2/2008 | Onggosanusi et al. | 370/328 |
| 2008/0232308 | A1* | 9/2008 | Dehner et al. | 370/329 |
| 2008/0279156 | A1* | 11/2008 | Tsai et al. | 370/336 |
| 2009/0052470 | A1* | 2/2009 | Yun et al. | 370/491 |

OTHER PUBLICATIONS

Yun Bae Kim, "PCT International Search Report and Written Opinion," WIPO, ISA/KR, Korean intellectual Property Office, Daejeon, Republic of Korea, Jan. 28, 2009, 10 pages.
Motorola, Inc., "R1-061723: Downlink Reference Signal Sequence Design," 3GPP TSG RAN1 on LTE, Cannes, France, Jun. 27-30, 2006, 5 pages.

* cited by examiner

*Primary Examiner*—Shuwang Liu
*Assistant Examiner*—Kenneth Lam

(57) ABSTRACT

A cellular communication system employs a plurality of bandwidths. The cellular communication system comprises a plurality of base stations (101, 103) each of which transmits a reference signal comprising a Generalised Chirp-Like, GCL, sequence. The length of the GCL sequence is dependent on the bandwidth employed by the base station (101, 103). A sequence generator (105) provides a first subset of GCL sequences for a first bandwidth selected from a set of possible GCL sequences for the first bandwidth in response to properties of a sub-sequence of GCL sequences. The sub-sequence has a length corresponding to a different bandwidth. Sequence processors (107, 109) select GCL sequences for base stations (101, 103) employing the first bandwidth from the first subset of GCL sequences. The invention exploits characteristics of GCL sequences to enable, facilitate or improve multiple bandwidth operation.

16 Claims, 8 Drawing Sheets

US 7,869,532 B2

CELLULAR COMMUNICATION SYSTEM AND A METHOD OF OPERATION THEREFOR

FIELD OF THE INVENTION

The invention relates to a cellular communication system employing a plurality of bandwidths.

BACKGROUND OF THE INVENTION

In order to provide improved communication services and increased efficiency, cellular communication systems are continuously developed and enhanced. Currently, the $3^{rd}$ Generation Partnership Project (3GPP) standards body is in the process of standardising improvements to the Universal Mobile Telecommunication System (UMTS) known as Long Term Evolution (LTE).

LTE is an example of a cellular communication system which employs a plurality of different bandwidths. Specifically, LTE is an Orthogonal Frequency Division Multiplex (OFDM) cellular communication system where the individual OFDM subcarriers have a fixed bandwidth and a different number of subcarriers is used for different bandwidths. LTE supports operation with a bandwidth of 1.25 MHz, 2.5 MHz, 5 MHz, 10 MHz and 20 MHz with 72, 144, 288, 600 and 1200 active 15 kHz subcarriers respectively (the remaining subcarriers are used as a guard band).

In a variable bandwidth OFDM cellular system such as 3GPP Evolved UTRA/LTE, the base stations transmit reference signals containing cell-specific reference sequences. The reference signal and sequence is used by the user equipments to detect the presence of specific base stations. In addition, the base stations transmit broadcast control channels (BCH) that among other things include data identifying the specific bandwidth used by the base station transmitting the broadcast control channel.

When a user equipment (UE) is switched on it proceeds to search for available base stations. This initial search is based on the user equipment trying to detect the presence of any reference signals and sequences and on the decoding of broadcast control channels for any detected reference signals.

In some systems, such as LTE, the initial cell-search process must be performed without the user equipment having any information of which bandwidths are actually used by the base stations. In LTE the user equipment may specifically perform the entire cell search process based on only on the narrowest bandwidth, i.e. it may exclusively use signals within a 1.25 MHz window for all the steps of the initial cell search regardless of the actual bandwidth used by the present base stations. This approach relies on the broadcast control channel for higher bandwidths being limited to a 1.25 MHz window corresponding to the narrowest bandwidth in use.

In order to ensure a robust and high performance cell search based on the reference signals and sequences, it is important that the reference sequences have properties which are particularly suitable for detection and estimation. Accordingly, the reference sequences should be selected as sequences that have strong auto correlation and cross correlation properties.

It has been proposed to base the reference sequences on Generalized Chirp-Like (GCL) sequences. GCL sequences have a number of attractive qualities that make them particularly suitable for use as reference sequences in systems such as LTE. Specifically, GCL sequences have very good auto-correlation properties and cross correlation properties between different GCL sequences of the same length. In addition, GCL sequences have constant amplitude thereby making them suitable for transmission as part of a reference signal.

A further description of GCL sequences may be found in e.g. United States of America patent application US2005/0226140 A1.

In systems such as LTE, the number of symbols in the reference sequence depends on the bandwidth used. Specifically, LTE employs a frame structure comprising 7 time slots with the reference signal being transmitted in the first time slot which has every sixth subcarrier allocated for transmission of a reference signal symbol. Thus, LTE has 12, 24, 48, 200 and 200 reference signal subcarriers or reference sequence symbols for the respective bandwidths of 1.25 MHz, 2.5 MHz, 5 MHz, 10 MHz and 20 MHz.

In order to apply the GCL sequences to LTE systems, sequences with different sequence lengths must be generated depending on the specific bandwidth used. However, this has associated disadvantages. For example, searching for GCL sequence of a higher bandwidth within a 1.25 MHz window is less reliable as the GCL properties are based on full length sequences. As GCL sequences are optimized for the bandwidth they are designed for, a user equipment not having information of the specific bandwidth used must search for all GCL sequences. However, such an approach is time and resource demanding thereby resulting in suboptimal cell search and acquisition performance.

Hence, an improved cellular communication system would be advantageous and in particular a system allowing increased flexibility, reduced complexity, reduced resource demand, reduced cell search/detection/acquisition delay, improved suitability for operation with different bandwidths and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a cellular communication system employing a plurality of bandwidths, the cellular communication system comprising: a plurality of base stations, each base station being arranged to transmit a reference signal comprising a Generalised Chirp-Like, GCL, sequence, a length of the GCL sequence being dependent on a bandwidth employed by the base station;

sequence means for providing a first subset of GCL sequences for a first bandwidth, the first subset comprising GCL sequences selected from a set of possible GCL sequences for the first bandwidth in response to properties of a sub-sequence of the GCL sequences of the set of possible GCL sequences, the sub-sequence having a length corresponding to a different bandwidth than the first bandwidth; and selection means for selecting a first GCL sequence for a first base station of the plurality of base stations employing the first bandwidth from the first subset of GCL sequences.

The invention may allow improved use of GCL sequences in systems employing a plurality of bandwidths. An improved cell search, detection and/or acquisition performance may be achieved. The use of GCL sequences may allow improved performance relative to other sequences as the advantageous properties of GCL sequences can be exploited. The invention may in many embodiments allow simplified and/or improved cell detection/search operation based on detection/search in only a subset of the first bandwidth (e.g. in only the second bandwidth) and/or for only a subset of sequences and/or sub-sequences. In many embodiments, the invention may reduce or eliminate the need for searching for all possible GCL sequences. Specifically, in many embodiments, a GCL search/detection operation may be based on only a subset of possible GCL sequences.

The invention exploits specific properties of GCL sequence subsets and/or sub-sequences to provide improved and/or facilitated multiple bandwidth operation.

The system may employ the plurality of bandwidths by allowing different base stations to have frequency bands of different bandwidths allocated to support communications from user equipments. In particular, the frequency band allocated to a base station may be divided into number of contiguous OFDM subcarriers which are all available to the base station. Base stations using different bandwidths may have different numbers of subcarriers. Thus, in some embodiments, the cellular communication system may specifically use OFDM with a fixed subcarrier bandwidth and a varying number of subcarriers corresponding to different bandwidths.

The sequence lengths may depend on the bandwidth with which they are associated. In particular, sequences for narrower bandwidths may be shorter than sequences for wider bandwidths and e.g. the sequence length of the GCL sequences may be approximately proportional to the bandwidth. Specifically, in some embodiments, bandwidths of 1.25 MHz, 2.5 MHz, 5 MHz, 10 MHz and 20 MHz may have associated (truncated) GCL sequence lengths of 12, 24, 48, 200 and 200 elements respectively.

The GCL sequences may be truncated GCL sequences. In some embodiments, a GCL sequence may be a subsection of a longer GCL sequence for a different bandwidth. In particular, in some embodiments GCL sequences for shorter bandwidths may be truncated GCL sequences for higher bandwidths. Thus, the different lengths for the GCL sequences of different bandwidths may be achieved by a different truncation of a GCL sequence. Specifically, for different bandwidths, transmitting different length GCL sequences may include transmitting sequences obtained by truncating the same GCL sequence to different lengths.

The second bandwidth may specifically be narrower than the first bandwidth.

According to another aspect of the invention there is provided a method of operation for a cellular communication system employing a plurality of bandwidths, the method comprising: a plurality of base stations transmitting a reference signal comprising a GCL sequence, a length of the GCL sequence being dependent on a bandwidth employed by the base station; providing a first subset of GCL sequences for a first bandwidth, the first subset comprising GCL sequences selected from a set of possible GCL sequences for the first bandwidth in response to properties of a sub-sequence of the GCL sequences of the set of possible GCL sequences, the sub-sequence having a length corresponding to a different bandwidth than the first bandwidth; and selecting a first GCL sequence for a first base station of the plurality of base stations employing the first bandwidth from the first subset of GCL sequences.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a cellular communication system using Orthogonal Frequency Division Multiplex (OFDM). In particular, the cellular communication system may be a Long Term Evolution-Universal Mobile Telecommunication System (LTE-UMTS). However, it will be appreciated that the described principles are not limited to this specific application but may be applied to many other cellular communication systems.

Figure 1:
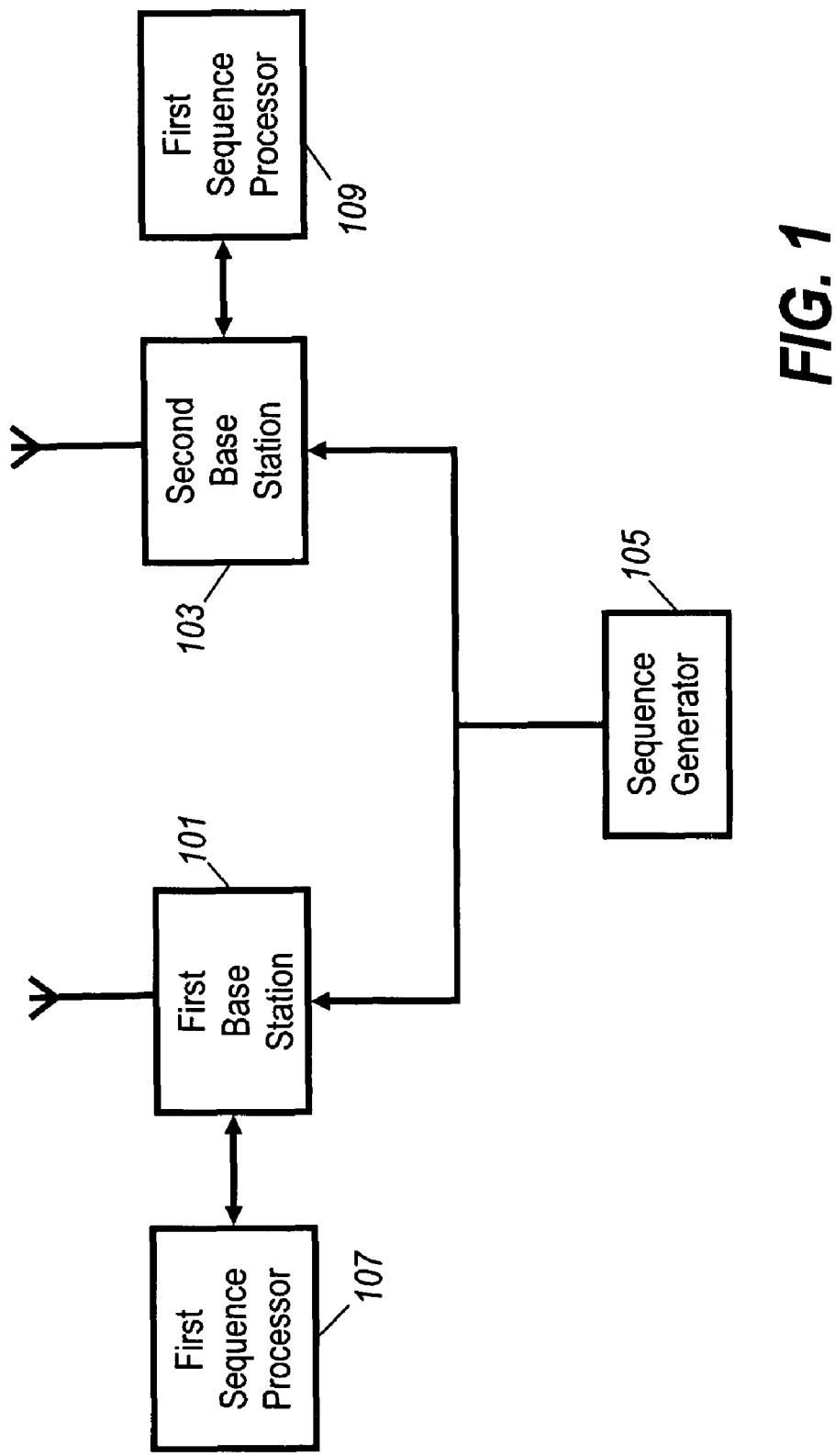
FIG. 1 illustrates an example of a cellular communication system in accordance with some embodiments of the invention.

FIG. 1 illustrates an example of a cellular communication system in accordance with some embodiments of the invention. The system comprises a plurality of base stations of which two base stations 101, 103 are shown. Each of the base stations 101, 103 support User Equipments (UEs) within a given cell and communicate with the UEs via air interface communication channels. A UE may be any communication entity capable of communication with the base stations over the air interface.

The system is a multiple bandwidth system wherein the base stations may use different bandwidths. In the example, each of the base stations 101, 103 may employ a bandwidth of 1.25 MHz, 2.5 MHz, 5 MHz, 10 MHz or 20 MHz. In the system, the base stations 101, 103 use an OFDM communication scheme and the bandwidth of the base station is divided into a number of subcarriers. In the system, all base stations use OFDM subcarriers having a fixed bandwidth of 15 kHz. Thus, the number of OFDM subcarriers for a specific cell depends on the bandwidth, and generally a doubling of the bandwidth approximately corresponds to a doubling of the number of available subcarriers (as some subcarriers are used as guard bands this relation only holds approximately). Specifically in the described system the different bandwidths correspond to 72, 144, 288, 600 and 1200 subcarriers respectively. For example, for a 20 MHz bandwidth 18 MHz (1200× 15 kHz) are used for active communications with the extra 2 MHz being reserved for guard bands.

In the system, a known reference signal sequence is transmitted which can be detected by the UEs. When a UE is switched on, it searches for the presence of reference signal sequences to determine whether any base stations are present. If a sequence is detected, the UE proceeds to decode a broadcast control channel transmitted by the base station. The initial search and detection of the reference signal sequence and the decoding of the broadcast control channel is in e.g. LTE performed without knowledge of the actual bandwidth of the base station. The information of the actual bandwidth employed is included in the broadcast control data of the broadcast control channel and following the decoding of this channel, the UE can proceed to use the identified bandwidth. In the system, the bandwidth of the broadcast control channel is for all bandwidths set to correspond to the lowest available bandwidth. Thus, broadcast control data is only transmitted in subcarriers which are present for all bandwidths, i.e. which fall within the 1.25 MHz bandwidth.

Figure 2:
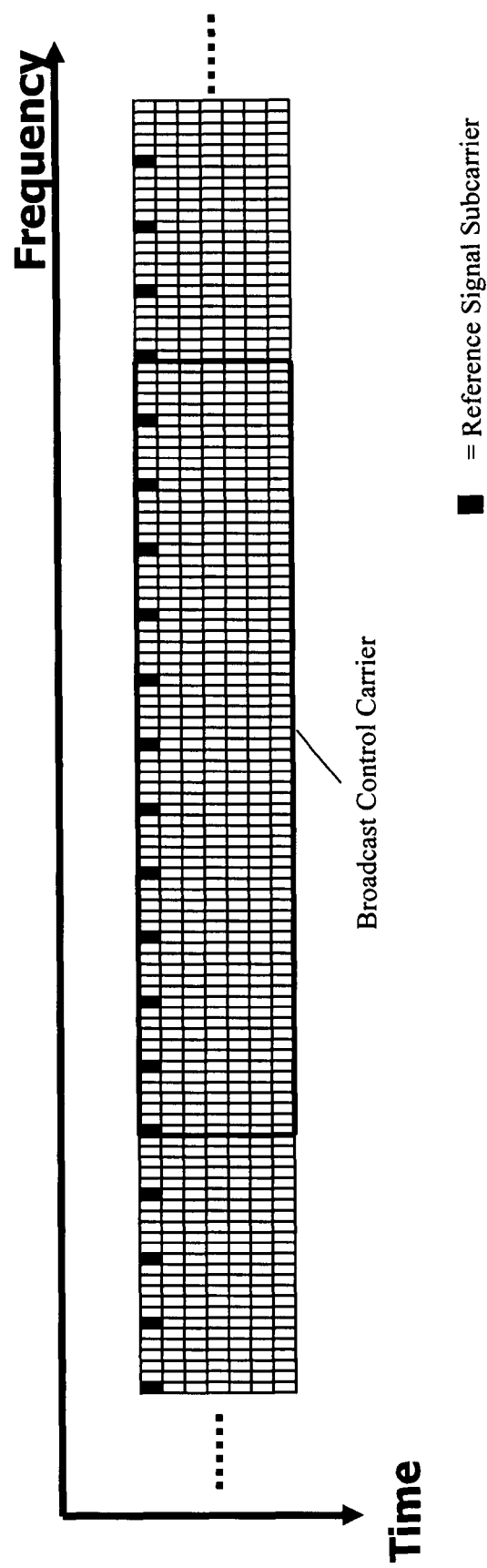
FIG. 2 illustrates an example of a frame structure for an OFDM cellular communication system.

Thus, in accordance with LTE, the base stations 101, 103 transmit a reference signal which can be used by UEs to detect the individual cells and base stations 101, 103. In a system such as LTE, the base stations 101, 103 transmit the elements or symbols of the reference signal sequence as a simultaneous transmission the elements in different frequency subcarriers of the first frequency band. Specifically, for the first time slot of each frame (comprising seven time slots for LTE), a number of subcarriers are reserved for the elements/symbols of the reference signal sequence. In LTE, every sixth subcarrier is allocated to transmitting the sequence. Thus, in the system a sequence of known data is distributed in the subcarrier domain. FIG. 2 illustrates an example of the distribution of the sequence in a subcarrier domain.

It will be appreciated that in some embodiments, some elements of a sequence may be transmitted sequentially. For example, in some embodiments a reference signal sequence may be distributed over a plurality of time slots.

In LTE, the reference signal sequence is not only used for detection of a base station but is also used to identify the detected base station. Specifically, the reference signal sequence depends on the cell identity allocated to the base station. Thus, by detecting a specific sequence, the UE will also identify a specific cell identity.

In order to provide efficient cell detection and identification, the reference signal sequences used should have strong auto correlation and cross correlation properties. Furthermore, the sequences should preferably have substantially constant amplitude.

GCL sequences have been proposed for LTE because these sequences have attractive properties including advantageous auto correlation, cross correlation and amplitude properties.

In the system, the GCL sequences may be determined from the equation:

$$S_u(k) = \exp\left\{-j2\pi u \frac{k(k+1)}{2N_G}\right\},$$
$$k = 0, \cdots, N_G - 1, u = 1, \cdots, N_G - 1$$

where $N_G$ is a length of a GCL sequence, k is an element number, u is an index identifying the sequence from the $N_G - 1$ possible GCL sequences of length $N_G$. It will be appreciated that equivalents which do not change auto correlation, cross correlation and amplitude properties of the sequences may also be used. For example, multiplication of the elements by a constant (complex value) may be applied in some embodiments, resulting in sequences given by:

$$S_u(k) = \alpha \cdot \exp\left\{-j2\pi u \frac{k(k+1)}{2N_G}\right\},$$

-continued
$$k = 0, \cdots, N_G - 1, u = 1, \cdots, N_G - 1$$

where α is a complex constant.

GCL sequences are limited to specific lengths. Specifically, the length $N_G$ of a GCL sequence given by the above equation is limited to lengths corresponding to prime numbers.

It is a characteristic of GCL sequences that for a sequence of length $N_G$ there are $N_G$ different sequences with strong cross correlation properties. Thus, for a sequence length of $N_G$, a set of $N_G$ GCL sequences exist that may be allocated to the base stations. However, as the inventors have realised, the properties of the GCL sequences are only guaranteed within the set and there is no guarantee that two GCL sequences of different lengths have strong cross-correlation properties.

In LTE where different bandwidths results in different number of subcarriers being used for the known sequence, the number of elements or symbols in the transmitted reference signal sequence depends on the employed bandwidth. As every sixth subcarrier is allocated to the sequence, the sequence lengths are 12, 24, 48, 100 and 200 elements for the bandwidths 1.25 MHz, 2.5 MHz, 5 MHz, 10 MHz and 20 MHz respectively.

It has been proposed that reference signal sequences for a given bandwidth are selected from the set of GCL sequences having a length corresponding to the next higher prime number. This sequence may then be truncated to match the available number of subcarriers. The number of total subcarriers $N_C$, reference signal subcarriers $N_p$, and corresponding basic sequence length $N_G$ is given in the following table:

| Occupied BW | $N_C$ | $N_G$ | $N_D$ |
|---|---|---|---|
| 20 MHz | 1200 | 211 | 200 |
| 10 MHz | 600 | 101 | 100 |
| 5 MHz | 288 | 53 | 48 |
| 2.5 MHz | 144 | 29 | 24 |
| 1.25 MHz | 72 | 13 | 12 |

In a cellular system such as LTE, the UEs may need to detect and decode the reference signal sequence without any information of the bandwidth employed by the base station. However, as a result, the UE is expected to search for all possible sequences for all possible bandwidths. This introduces substantial delay, complexity and resource usage. Furthermore, if base stations using different bandwidths interfere with each other, the poor cross correlation properties will substantially reduce performance.

In the system of FIG. 1 the base stations 101, 103 are coupled to a sequence generator 105 which provides a first subset of GCL sequences for a first frequency. The GCL sequences have to a GCL sequence length as indicated by the table above. The sequences are selected from a set of possible GCL sequences for the first bandwidth in response to properties of a sub-sequence of sequences of the set of possible GCL sequences. Thus, a subset of sequences of a given length is selected from the set of possible sequences of that length. The sub-sequence is selected such that it has a length that corresponds to a GCL sequence length for one of the other frequencies.

It will be appreciated that where the GCL sequence length does not correspond exactly to the number of reference signal elements (as given by the number of allocated subcarriers), the GCL sequences may be truncated GCL sequences.

In particular, the sequence generator 105 determines a subset of GCL sequences out of the possible GCL sequences for the highest bandwidth depending on properties of sub-sequences of these sequences. The sub-sequences may specifically correspond to sequences which fall within the lower bandwidths. For example, a subset of truncated GCL sequences of length 200 may be selected from all the possible truncated GCL sequences of length 200 based on the properties of the elements which will be transmitted in the subcarriers falling within the band that would also have been used by the base station if this had employed a 1.25 MHz bandwidth.

In accordance with LTE, 12 different cell identities may be used. Accordingly, only 12 different reference signal sequences are necessary. However, the reference signal length for a 20 MHz bandwidth is 200 elements (200 subcarriers) and the next higher prime number is 211. Accordingly, the sequence generator 105 generates 211 GCL sequences of length 211. It then proceeds to select a subset of 12 of these GCL sequences. The 12 GCL sequences are then truncated to 200 elements.

The base stations 101, 103 of the system which employ a bandwidth of 20 MHz will subsequently select a reference signal sequence from the subset comprising the 12 truncated GCL sequences. The selection of the 12 truncated GCL sequences depends on characteristics of a sub-sequence of the 211 sequences. Specifically, the sub-sequences may be selected as the elements which are transmitted in the subcarriers which would also be transmitted in lower bandwidths and specifically the sub-sequences may be the sub-sequence of elements that would be transmitted in the subcarriers of the lowest 1.25 MHz bandwidth.

The sequence generator 105 specifically selects the 12 sequences such that the cross correlation properties for the sub-sequences are advantageous. Thus, for the set of 12 sequences, a cross correlation taking into account only the elements of the subcarriers which coincide with the 1.25 MHz would also be low and preferably would be minimised for the selected subset. Also, the sequence generator 105 may select the 12 sequences such that the auto correlation properties for the sub-sequences are advantageous.

As an example, the sequence generator 105 may select the 12 GCL sequences for which the sub-sequences of the 12 elements transmitted in the subcarriers of the 1.25 MHz bandwidth most closely resemble the GCL sequences for the reference signal sequence length of the 1.25 MHz bandwidth.

Thus, the sequence generator 105 generates a subset of (truncated) GCL sequences from which the base stations 101, 103 may select a specific sequence to use. In the example, the selected set of sequences is fed from the sequence generator 105 to the base stations 101, 103.

Each of the base stations 101, 103 is coupled to a sequence processor 107, 109 which selects a specific GCL sequence for the individual base station 101, 103 from the subset of GCL sequences. Specifically, based on the cell identity assigned to the base stations 101, 103, the sequence processors 107, 109 will select the sequence as the sequence which is linked to the cell identity.

It will be appreciated that although the above description has focussed on a dynamic and remote generation of the appropriate subset of GCL sequences, other embodiments may use other approaches. Specifically, the (sub)set of GCL sequences for a given bandwidth may be finally determined during the design phase of the system. Likewise, the linking between cell identity and specific sequence may be determined during the design phase. For example, for each cell identity, Technical Specifications may be standardised which identifies a specific reference signal sequence for each bandwidth and each cell identity.

Thus, rather than being coupled to an external sequence generator 105, each base station 101, 103 may comprise internal means that provides the linking between a cell identity and an associated (truncated) GCL sequence for each bandwidth. The subset of GCL sequences may e.g. be provided simply by retrieving the GCL sequences from a look-up table locally stored in the base station. Thus, when allocated a cell identity and bandwidth, each base station may simply retrieve the corresponding (truncated) GCL sequence from the look up table and start transmitting this in the appropriate subcarriers for the reference signal.

In the following, a first example of the selection of GCL sequences for both the highest bandwidth and for lower bandwidths will be described. In this example, the GCL sequences for each bandwidth are selected as GCL sequences of the length corresponding to the specific bandwidth and specifically the GCL sequences are determined by a possible truncation of GCL sequences with a length equal to the first prime number equal to larger than the number of available subcarriers. Furthermore, GCL sequences of higher bandwidths are selected such that the elements falling within a lower bandwidth are similar to at least one of the sequences in the lower bandwidth. Specifically, for each bandwidth a set of 12 GCL sequences is selected and the sequences are selected such that the sets are similar for the overlapping elements. It will be appreciated that any suitable similarity criterion may be selected and specifically a similarity criterion may be that a cross correlation value between the elements of the sub-sequence and the elements of the corresponding elements of sequences at the lower bandwidths is below a given threshold for all sequences of the lower bandwidth except for one and that the cross correlation for this sequence is above a given threshold.

In the example, a set of GCL sequences for each of the bandwidths is selected from the set of GCL sequences given by:

$$S_u(k) = \exp\left\{-j2\pi u \frac{k(k+1)}{2N_G}\right\},$$

$$k = 0, \cdots, N_G(BW) - 1, u = 1, \cdots, N_G(BW) - 1$$

where $N_G(BW)$ is a length of the GCL sequence for the specific bandwidth BW, k is an element number for the sequence, u is an index identifying the sequence from the $N_G-1$ possible GCL sequences of length $N_G$.

Again it will be appreciated that transformations which do not change the auto correlation, cross correlation and amplitude properties may be applied to the sequences.

Thus, in the system all sequences are actual, albeit potentially truncated, GCL sequences derived from the GCL sequences with a length equal to or immediately higher than the reference signal sequence length. However, for the higher bandwidths where more GCL sequences are available than required, a set of GCL sequences are selected such that these sequences have sub-sequences which resemble shorter GCL sequences used for lower bandwidths.

In the specific example, the set of sequences for each bandwidth comprises the sequences with the following indexes:

$$u_{BW1} = \text{Round}\left(u_{BWmin} \cdot \frac{N_{G,BW1}}{N_{G,BWmin}}\right),$$

$$u_{BWmin} = 1, 2, \ldots N_{G,BWmin} - 1$$

where $u_{BW1}$ is a GCL sequence index for the bandwidth, ($u_{BWmin}$ is a GCL sequence index for a minimum bandwidth (i.e. the 1.25 MHz bandwidth in the specific example)), $N_{G,BW1}$ is a GCL sequence length for the bandwidth and $N_{G,BW1}$ is a sequence length for the minimum bandwidth (i.e. 13 in the specific example).

Thus, the above equation defines a set of 12 GCL sequences for each of the possible bandwidths. Furthermore, the sets are selected such that cross correlation properties between GCL sequences of different lengths are still advantageous (i.e. they are reduced/minimized for all sequences except the sequence at the lower bandwidth allocated to the same cell identity).

The individual base station 101, 103 accordingly selects a specific GCL sequence from the set of 12 sequences defined for the specific bandwidth used by the base station. The selection is based on the cell identity allocated to the base station and specifically each of the 12 sequences are linked to a specific cell identity.

The specific indexes used in the system of FIG. 1 are presented in the following table:

Example indices of $u_{BW1}$ for each bandwidth

| BW [MHz] | $N_G$ | 1 | 2 | 3 | 4 | 5 | 6 | 7 | 8 | 9 | 10 | 11 | 12 |
|---|---|---|---|---|---|---|---|---|---|---|---|---|---|
| 20 | 211 | 16 | 32 | 49 | 65 | 81 | 97 | 114 | 130 | 146 | 162 | 179 | 195 |
| 10 | 101 | 8 | 16 | 23 | 31 | 39 | 47 | 54 | 62 | 70 | 78 | 85 | 93 |
| 5 | 53 | 4 | 8 | 12 | 16 | 20 | 24 | 29 | 33 | 37 | 41 | 45 | 49 |
| 2.5 | 29 | 2 | 4 | 7 | 9 | 11 | 13 | 16 | 18 | 20 | 22 | 25 | 27 |
| 1.25 | 13 | 1 | 2 | 3 | 4 | 5 | 6 | 7 | 8 | 9 | 10 | 11 | 12 |

The allocation of the individual elements of the selected GCL sequence to the subcarriers is furthermore performed such that the GCL sequences of different bandwidths are aligned thereby ensuring that the sub-sequence of the longer GCL sequences are aligned with the shorter GCL sequences.

Specifically, in the system of FIG. 1, the lower bandwidths are subbands of the higher bandwidths. Thus, the 20 MHz bandwidth completely encompasses the other bandwidths and specifically the 1.25 MHz bandwidth. In the system, all bandwidths are centred on the carrier frequency of the base station. Thus, if the base station uses a 20 MHz bandwidth, this will extend by ±10 Mhz on either side of the carrier frequency. If the base station uses a 10 MHz bandwidth, this will extend by ±5 Mhz on either side of the carrier frequency etc.

In the system, the elements of the GCL sequences are allocated to the specific subcarriers such that the sequence is aligned with an alignment frequency. This, frequency is a frequency which also falls within the lower bandwidths and may specifically be the central frequency or carrier frequency allocated to the base station.

Figure 3:
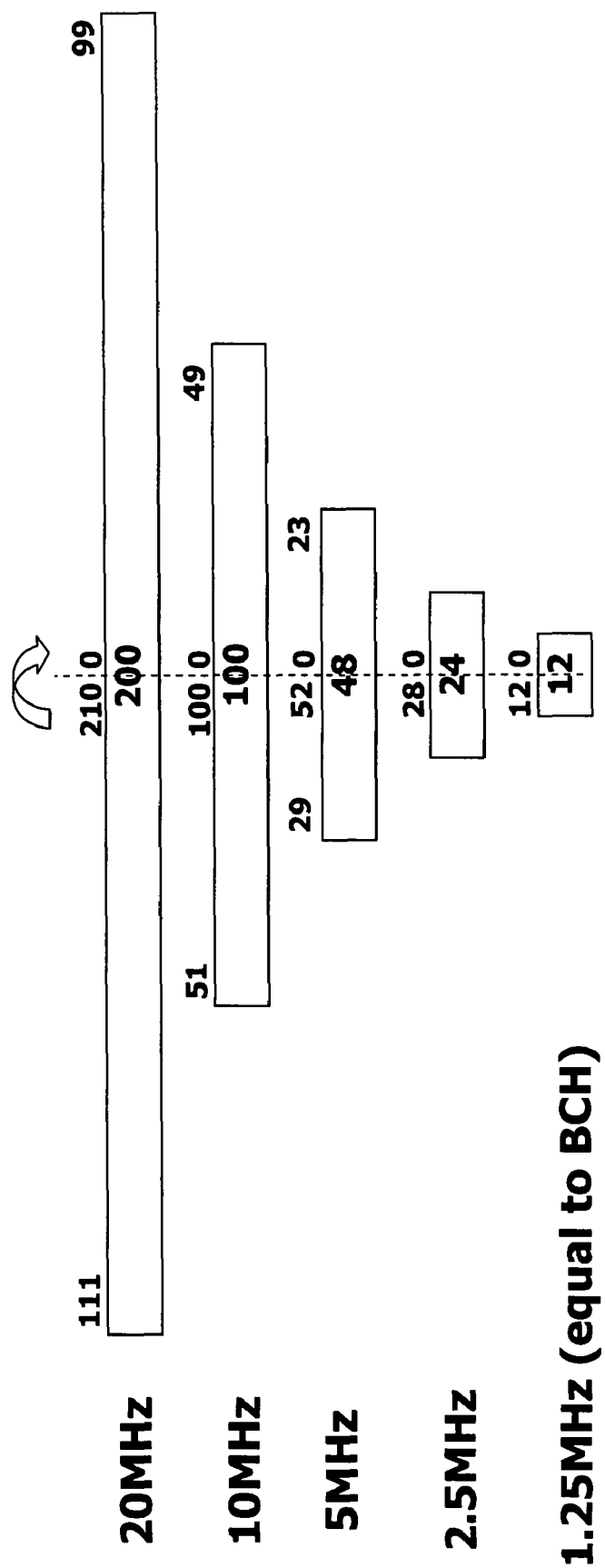
FIG. 3 illustrates an example of allocation of GCL sequence elements to subcarriers in accordance with some embodiments of the invention.

FIG. 3 illustrates a specific example of an allocation of element numbers along the subcarrier domain for different bandwidths. In the example, the initial element of each GCL sequence (i.e. k=0) is allocated to a subcarrier at or next to the central frequency which is also the carrier frequency. The next elements of the sequence are allocated to the subsequent subcarriers until the end of the frequency band is reached. Also, the last element of the GCL sequence (i.e. k=$N_G$(BW)−1) is allocated to the subcarrier next to the carrier frequency (in the direction towards lower frequencies). Thus, the last element of the GCL sequences is allocated to a subcarrier being the closest subcarrier to the subcarrier having the first element of the first GCL sequence allocated (in the appropriate direction). The elements with decreasing indices are then allocated to subcarriers in the direction towards lower frequencies.

If the GCL sequence length is longer than the number of available subcarriers, this approach automatically leads to a truncation of the GCL sequences. However, as illustrated in FIG. 3, the truncation will be a truncation of the elements around k=$N_G$(BW)/2 rather than at the end of the sequence.

As a consequence of this alignment and allocation, the sub-sequences within the lowest bandwidth (1.25 MHz) of any of employed GCL sequences will be one that has attractive cross-correlation properties with respect to any other GCL sequence or sub-sequence within this bandwidth. Thus, the approach exploits specific properties of GCL sequences and sub-sequences to provide a set of GCL sequences for different bandwidths (and thus with different lengths) while maintaining advantageous properties between the sequences.

The described approach for selecting GCL sequences may substantially improve and/or facilitate operation and performance in a multiple bandwidth cellular communication system.

For example, a UE may perform the initial search and detection based only on GCL sequences which have a length of the lowest bandwidth although the base stations which are to be detected may use higher bandwidths and longer sequences.

Figure 4:
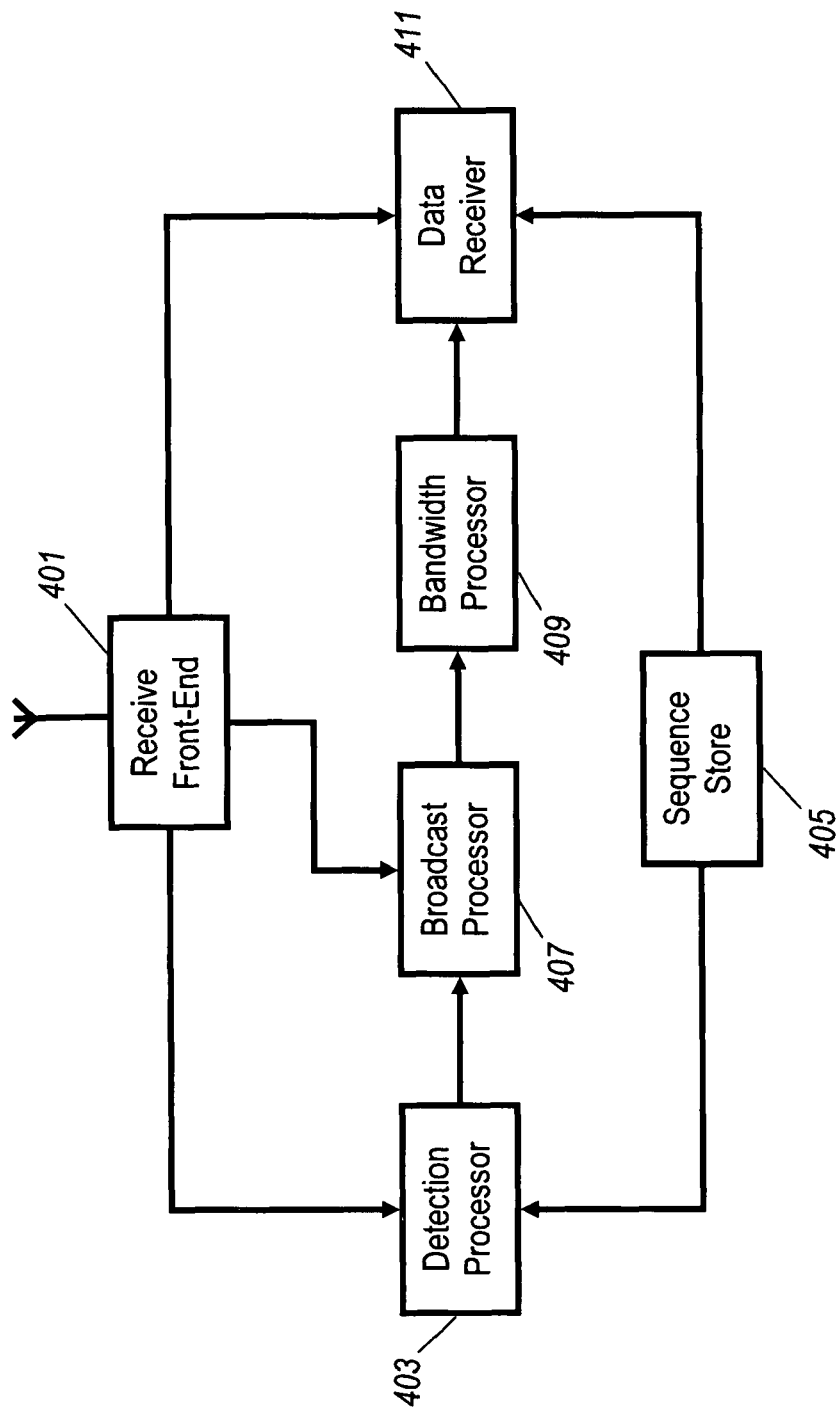
FIG. 4 illustrates an example of a user equipment in accordance with some embodiments of the invention.

FIG. 4 illustrates an example of a UE in accordance with such an example.

The UE comprises a receive front-end 401 which performs filtering, amplification, down-conversion etc as well known to the skilled person. The receive front-end 401 is coupled to a detection processor 403 which is arranged to detect a presence of the first GCL sequence in response to a comparison between the received signal and a second GCL sequence associated with a different bandwidth. The second GCL sequence has fewer elements than the first GCL sequence. The detection processor 403 is coupled to a sequence store 405 which comprises the GCL sequence set for each possible bandwidth. However, the detection processor 403 retrieves only the GCL sequences for the narrowest bandwidth and only uses these sequences to search for the presence of GCL sequences whether these are associated with the narrowest bandwidth or with higher bandwidths.

Specifically, the detection processor 403 may detect a 200 element long GCL sequence in a 20 MHz bandwidth based on a comparison with a locally stored 12 element long sequence corresponding to the 1.25 MHz bandwidth. Specifically, the detection processor 403 can sequentially or in parallel perform a correlation of the received signal in the 12 reference signal subcarriers of the 1.25 MHz bandwidth and the 12 GCL sequences defined for the 1.25 MHz bandwidth.

In the case where a base station is present which uses the 1.25 MHz bandwidth, this approach will result in a high correlation value for one of the GCL sequences indicating that the corresponding GCL sequence is being received. Furthermore, if a higher bandwidth is used by the base stations, the GCL sequence used in the 12 subcarriers of the 1.25 MHz bandwidth will still be very similar to the corresponding GCL sequence of the 1.25 MHz bandwidth. Thus, a high correlation value will still be generated resulting in the GCL sequence of the higher bandwidth also being detected despite the detection processor 403 only considering GCL sequences of the narrow bandwidth. Also, as the cross correlations between sequences of different bandwidths allocated to different cell identities is low, the probability of a false detection due to higher bandwidth GCL sequences is also reduced.

Thus, the selected GCL sequences allows the UE to perform a reliable detection of base stations without knowing the bandwidths used by the individual base station and while only monitoring a set of GCL sequences specified for the lowest bandwidth. Thus, the detection processor 403 merely monitors and searches for 12 reference signal sequences.

In the example of FIG. 4, the detection processor 403 is coupled to a broadcast processor 407 which is arranged to receive the broadcast control channel transmitted by the detected base station. In order to do so, the broadcast processor 407 first determines a propagation channel estimate for the propagation channel between the base station and the UE. The channel estimate is generated based on a comparison between the received signal and the GCL sequence of the narrowest bandwidth. Thus, in the case where the base station employs the narrowest bandwidth, an accurate local replica of the reference signal sequence is used to determine the channel estimate. If the base station employs a different bandwidth, the local replica of the reference signal sequence used to determine the channel estimate is only an approximate replica of the actual sequence in subcarriers falling in the 1.25 MHz bandwidth. Although this may introduce some degradation it will be negligible or at least acceptable in most scenarios.

Based on the generated channel estimate, the broadcast processor 407 proceeds to receive and decode the broadcast control channel. The broadcast control data is passed to a bandwidth processor 409 which proceeds to determine the bandwidth used by the detected base station from the broadcast control data received. Specifically, the base stations can include explicit data indicating the used bandwidth in the transmitted broadcast control channel.

The bandwidth processor 409 is coupled to a data receiver 411 which is also coupled to the sequence store 405. The data receiver 411 receives an indication of the specific bandwidth used by the base station from the bandwidth processor 411. It can then proceed to communicate with the base station with full knowledge of the actual bandwidth used and thus can use the full transmitted GCL sequence. Accordingly, the data receiver 411 retrieves the full length GCL sequence from the sequence store 405 and uses this accurate sequence to derive a more accurate channel estimate.

Thus, the system allows a much improved and simplified search and acquisition process. Furthermore, only a negligible or acceptable degradation is introduced for the initial phases with no long term degradation being introduced.

Figure 5:
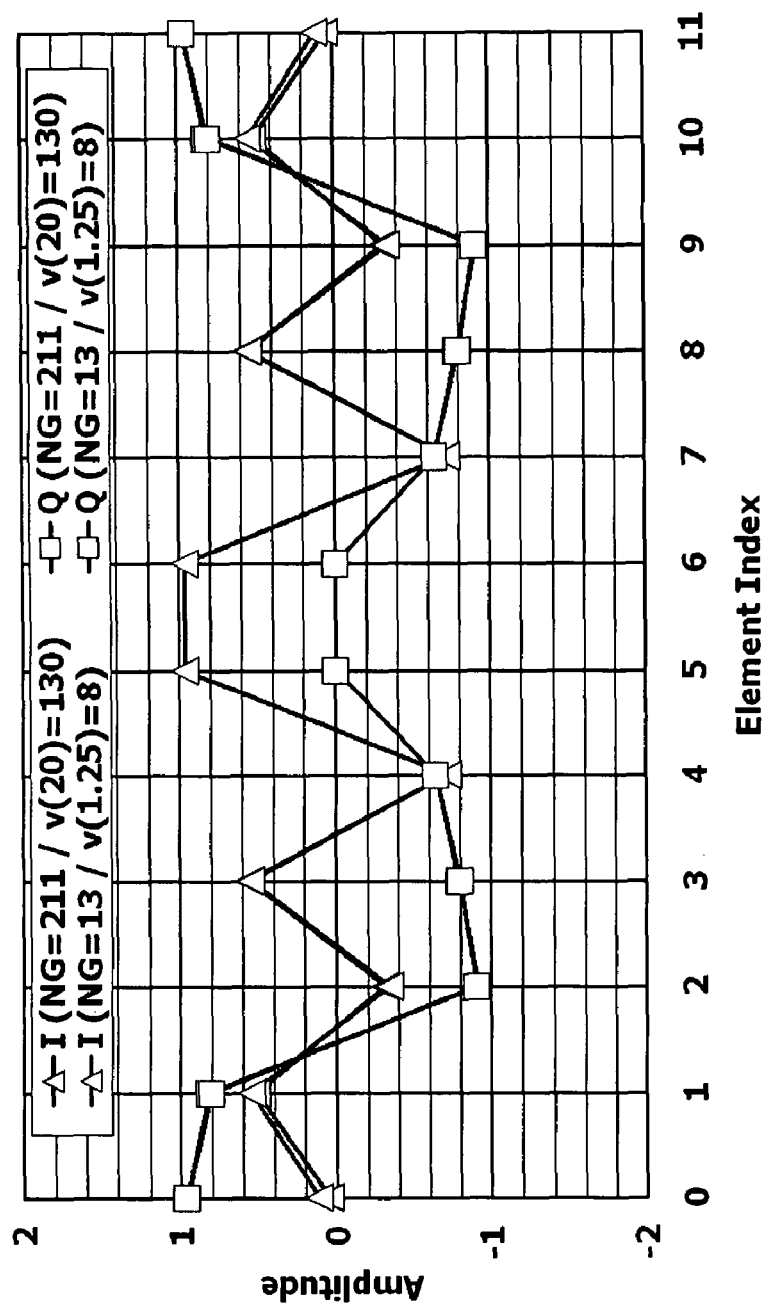
FIG. 5 illustrates an example of GCL sequence elements in accordance with some embodiments of the invention.

FIG. 5 illustrates an example of the amplitude of the real and imaginary value for two GCL sequences. In particular, the figure illustrates a GCL sequence with index 8 for a 1.25 MHz bandwidth compared to a GCL sequence with index 130 for a 20 MHz bandwidth.

Figure 6:
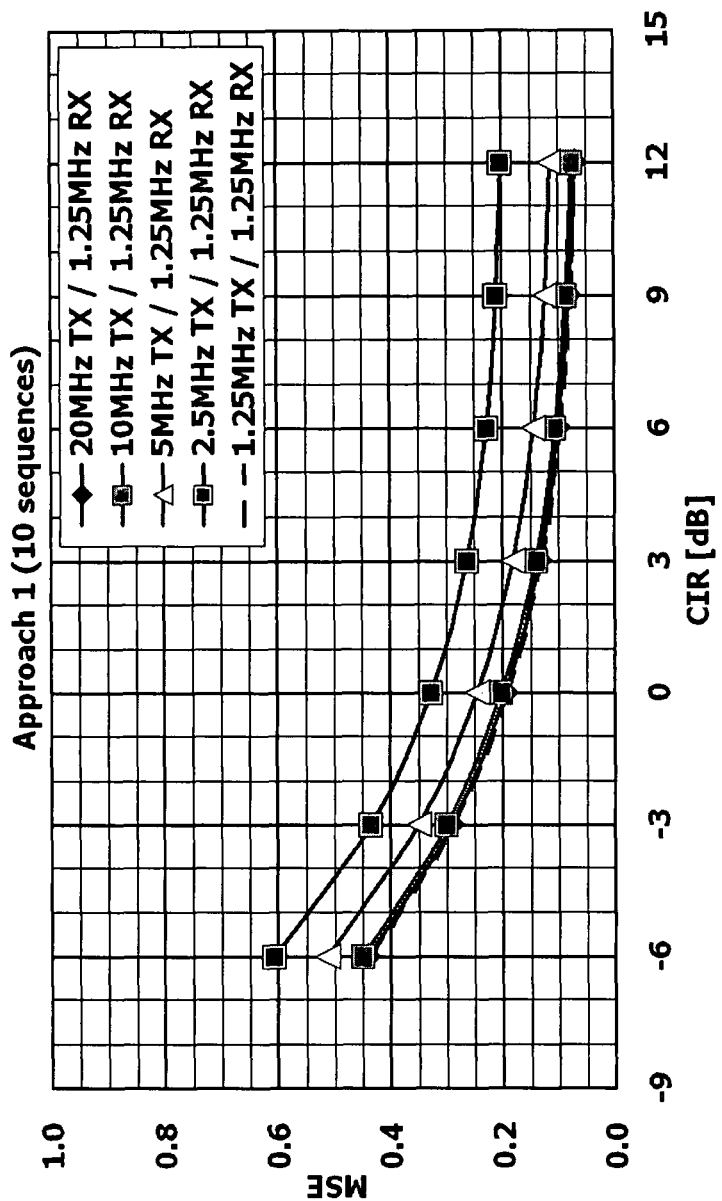
FIG. 6 illustrates an example of detection performance for GCL sequences in accordance with some embodiments of the invention.

FIG. 6 illustrates a detection error performance for detecting GCL sequences of higher bandwidths using GCL sequences of lower bandwidths. Specifically the Mean Square Error (MSE) of the difference between the estimated channel response and the actual channel response is shown as a function of the Carrier to Interference Ratio (CIR). As can be seen, the degradation is negligible for 10 and 20 MHz bandwidths and low for 2.5 MHz and 5 MHz bandwidths.

In the following a second specific example will be described wherein the GCL sequences for lower bandwidths are selected in response to a truncation of GCL sequences comprised in the set determined a higher bandwidth and specifically for the maximum bandwidth.

Thus, as in the previous example, a set of GCL sequences are determined for a higher frequency based on the properties of a sub-sequence of the GCL sequences.

Again, the GCL sequences for the maximum bandwidth may be selected according to $$S_u(k) = \exp\left\{-j2\pi u \frac{k(k+1)}{2N_G}\right\},$$
$$k = 0, \cdots, N_G - 1, u = 1, \cdots, N_G - 1$$

where $N_G$ is the length of the GCL sequence for the bandwidth, k is an element number for the sequence and u is an index identifying the sequence from the $N_G$−1 possible GCL sequences.

In the example, 12 GCL sequences are selected from the 210 possible GCL sequences but in this example the selection is not based on properties relative to other shorter GCL sequences associated with other bandwidths or GCL sequence lengths or sets, but are selected such that the 12 GCL sub-sequences themselves have attractive properties and specifically have strong auto correlation and cross correlation values.

Specifically, the subset of sequences is selected as those sequences having the following indices:

$$u_{BW1} = \text{Round}\left(u_{BWmin} \cdot \frac{N_{G,VW1}}{M+1}\right),$$
$$u_{BWmin} = 1, 2, \ldots M$$

where $u_{BW1}$ is a GCL sequence index for the bandwidth (i.e. 20 MHz in the example), $N_{G,BW1}$ is a GCL sequence length for the bandwidth (i.e. 20 MHz in the example) and M is a number of GCL sequences in the subset (i.e. 12 in the example).

Thus, the 12 GCL sequences used for the maximum bandwidth are given by the above equations. However, in contrast to the previous example, the GCL sequences for the lower bandwidths are not determined from (or as) GCL sequences with a length given by the number of reference signal subcarriers allocated to the bandwidth. Rather, the GCL sequences for these bandwidths are directly obtained by truncating the GCL sequences for the maximum bandwidth to a length which is appropriate for the bandwidth. Thus, the GCL sequences for the lower bandwidths are truncated GCL sequences derived by truncation of the single set of GCL sequences determined for the maximum bandwidth.

In the example, the truncation is arranged to maintain a central portion of the GCL sequences of the first subset. Thus, the sub-sequences to be used at lower frequencies includes the central element of the GCL sequences for the maximum bandwidth.

Figure 7:
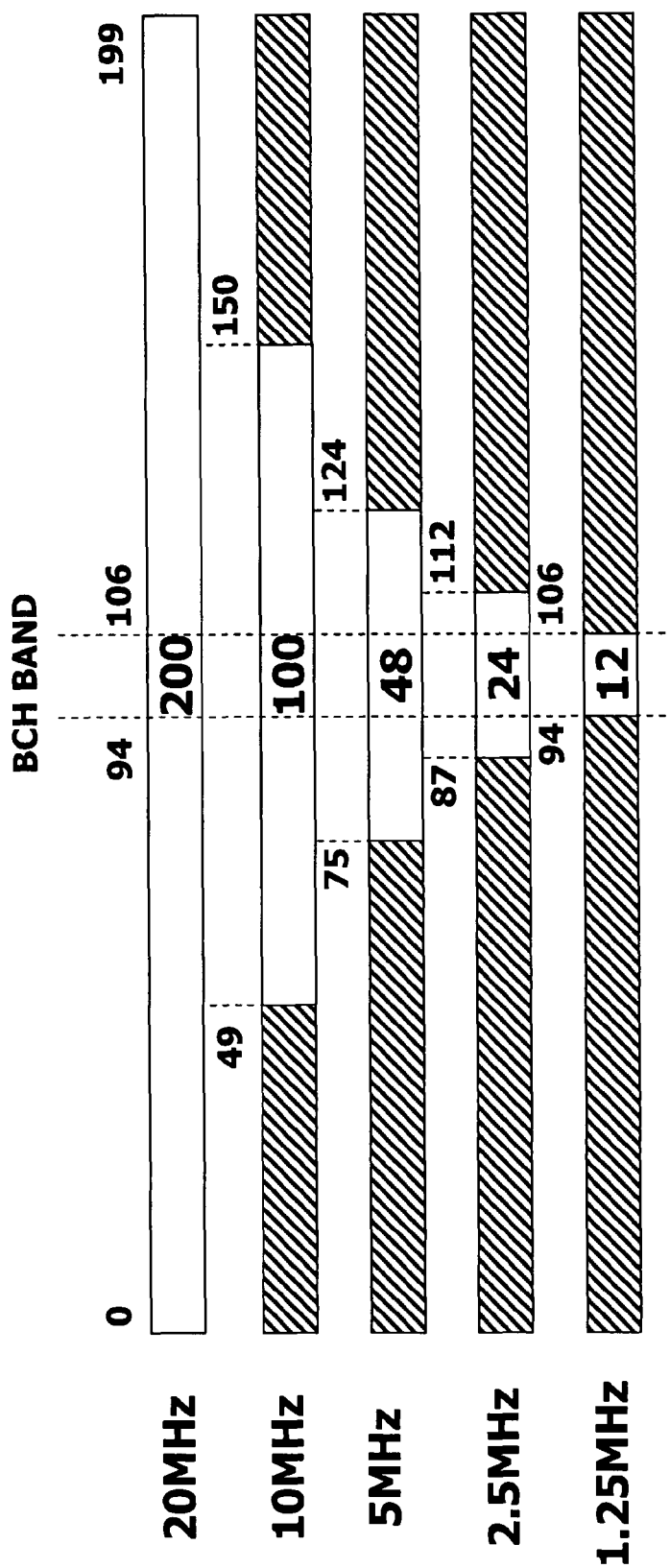
FIG. 7 illustrates an example of allocation of GCL sequence elements to subcarriers in accordance with some embodiments of the invention.

FIG. 7 illustrates a specific example of an allocation of element numbers along the subcarrier domain for different bandwidths. As illustrated, the reference signal elements/symbols in the 12 subcarriers within the broadcast control channel correspond to elements 94-105 of the 211 element length GCL sequence for that cell identity regardless of what the employed bandwidth is.

Thus, in the example, the subset of GCL sequences are selected such that the sub-sequences in the lower bandwidths (e.g. the sub-sequence of elements 94-105) have properties that allow them to be used as reference signal sequences. Specifically, the selection of the subset of GCL sequences to be truncated is such that the truncated GCL sequences are sequences that are similar to corresponding non or minimally truncated GCL sequences.

It will be appreciated that the previously described approach of detecting a base station by a UE may also be used in this example. Specifically, the detection processor 203 may monitor for the twelve truncated GCL sequences derived by truncating the 12 length sequences of length 211. As the elements of these twelve truncated GCL sequences are the same for all bandwidths, a correlation can be performed without knowing the exact applied bandwidth. The same approach of determining a channel estimate, receiving the broadcast channel and then applying the full length (possibly truncated) GCL sequence may be applied.

Thus, in contrast to the previous example where individual and different GCL sequences were derived for each bandwidth and selected such that they were similar within a sub-sequence, the current approach applies the same sequence elements in all bandwidths but selects this sub-sequence to be similar to the GCL sequences for the minimum bandwidth. This approach may improve e.g. the detection and channel estimation as the local replica exactly corresponds to the transmitted data. However, some degradation may instead be incurred due to the truncated sequences having less optimal properties than full length or minimally truncated GCL sequences.

Figure 8:
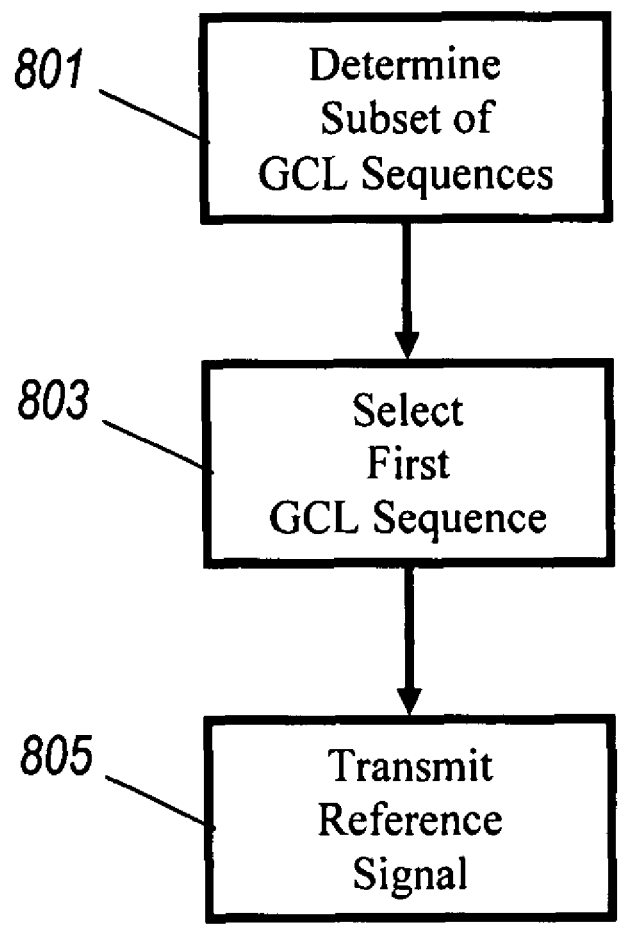
FIG. 8 illustrates an example of a method of operation for a cellular communication system in accordance with some embodiments of the invention.

FIG. 8 illustrates an example of method of operation for a cellular communication system employing a plurality of bandwidths in accordance with some embodiments of the invention. In the system, base stations transmit a reference signal comprising a GCL sequence where the length of the GCL sequence is dependent on a bandwidth employed by the base station.

The method starts in step 801 wherein a first subset of GCL sequences is provided for a first frequency. The GCL sequences are selected from a set of possible GCL sequences for a first bandwidth in response to properties of a sub-sequence of sequences of the set of possible GCL sequences where the sub-sequence has a length corresponding to a different bandwidth.

Step 801 is followed by step 803 wherein a first GCL sequence is selected for a first base station of the plurality of base stations employing the first bandwidth from the first subset of GCL sequences.

Step 803 is followed by step 805 wherein the first base station transmits a reference signal comprising the first GCL sequence.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A cellular communication system employing a plurality of bandwidths, the cellular communication system comprising:

a plurality of base stations, each base station being arranged to transmit a reference signal comprising a Generalised Chirp-Like, GCL, sequence, a length of the GCL sequence being dependent on a bandwidth employed by the base station;

sequence means for providing a first subset of GCL sequences for a first bandwidth, the first subset comprising GCL sequences selected from a set of possible GCL sequences for the first bandwidth in response to properties of a sub-sequence of the GCL sequences of the set of possible GCL sequences, the sub-sequence having a length corresponding to a different bandwidth than the first bandwidth;

selection means for selecting a first GCL sequence for a first base station of the plurality of base stations employing the first bandwidth from the first subset of GCL sequences; and means for selecting sequences for a second bandwidth in response to a truncation of GCL sequences of the first subset, the second bandwidth being lower than the first bandwidth;

wherein the truncating means is arranged to maintain a central portion of the GCL sequences of the first subset.

2. The cellular communication system of claim 1 wherein the first subset comprises GCL sequences for which elements of the sub-sequence and elements of a GCL sequence for the different bandwidth meet a similarity criterion.

3. The cellular communication system of claim 1 wherein the set of possible GCL sequences is substantially given by:

$$S_u(k) = \exp\left\{-j2\pi u \frac{k(k+1)}{2N_G}\right\},$$

$$k = 0, \cdots, N_G - 1, u = 1, \cdots, N_G - 1$$

where $N_G$ is a length of a GCL sequence for the first bandwidth, k is an element number, u is an index identifying a GCL from $N_G-1$ possible GCL sequences of length $N_G$.

4. The cellular communication system of claim 1 wherein GCL sequences for each bandwidth of the plurality of bandwidths are GCL sequences from a set of GCL sequences substantially given by:

$$S_u(k) = \exp\left\{-j2\pi u \frac{k(k+1)}{2N_G}\right\},$$

$$k = 0, \cdots, N_G(BW) - 1, u = 1, \cdots, N_G(BW) - 1$$

where $N_G(BW)$ is a length of a GCL sequence for a bandwidth BW, k is an element number, u is an index identifying a GCL sequence from $N_G-1$ possible GCL sequences of length $N_G$.

5. The cellular communication system of claim 4 wherein the first subset comprises only GCL sequences having an index given by:

$$u_{BW1} = \text{Round}\left(u_{BWmin} \cdot \frac{N_{G,BW1}}{N_{G,BWmin}}\right),$$

$$u_{BWmin} = 1, 2, \ldots N_{G,BWmin} - 1$$

where $u_{BW1}$ is a GCL sequence index for the first bandwidth, $N_{G,BW1}$ is a GCL sequence length for the first bandwidth and $N_{G,BWmin}$ is a sequence length for a minimum bandwidth.

6. The cellular communication system of claim 4 wherein the first base station is arranged to transmit at least some elements of the first GCL sequence as a simultaneous transmission of the at least some elements in different frequency subcarriers of the first bandwidth.

7. The cellular communication system of claim 6 wherein at least some of the first bandwidth overlaps a second bandwidth of the plurality of bandwidths, the second bandwidth being smaller than the first bandwidth and the cellular communication system further comprises alignment means for aligning the first GCL sequence with an alignment frequency within the second bandwidth.

8. The cellular communication system of claim 7 wherein the alignment frequency corresponds to a center frequency of the second bandwidth and the alignment means is arranged to align an initial element of the first GCL sequence with the alignment frequency.

9. The cellular communication system of claim 7 further comprising allocating means for allocating elements of the first GCL sequence to subcarriers such that a last element of the first GCL sequence is allocated to a subcarrier being a closest subcarrier a subcarrier having the first element of the first GCL sequence allocated.

10. The cellular communication system of claim 4 further comprising means for truncating the first GCL sequence to a number of elements corresponding to a reference signal sequence length for the first bandwidth.

11. The cellular communication system of claim 1 further comprising at least one user equipment, the user equipment comprising:

means for detecting a presence of the first GCL sequence in response to a comparison between a received signal and a second sequence associated with a second bandwidth, the second sequence having fewer elements than the first GCL sequence.

12. The cellular communication system of claim 1 further comprising at least one user equipment, the user equipment comprising:

means for determining a propagation channel estimate for a propagation channel between the first base station and the user equipment in response to a comparison between a received signal and a second sequence associated with a second bandwidth, the second sequence having fewer elements than the first GCL sequence.

13. The cellular communication system of claim 12 wherein the user equipment further comprises:

means for receiving a broadcast control channel in response to the channel estimate;

means for determining the first bandwidth in response to received data of the broadcast control channel; and means for determining the first GCL sequence in response to the first bandwidth.

14. The cellular communication system of claim 1 wherein the GCL sequences of the first subset are GCL sequences from a set of GCL sequences having elements substantially given by:

$$S_u(k) = \exp\left\{-j2\pi u \frac{k(k+1)}{2N_G}\right\},$$

$$k = 0, \cdots, N_G - 1, u = 1, \cdots, N_G - 1$$

where $N_G$ is a length of a GCL sequence for the first bandwidth, k is an element number, u is an index identifying a sequence from the $N_G-1$ possible GCL sequences of length $N_G$ and the first subset comprises only GCL sequences having an index given by:

$$u_{BW1} = \text{Round}\left(u_{BWmin} \cdot \frac{N_{G,BW1}}{M+1}\right),$$

$$u_{BWmin} = 1, 2, \ldots M$$

where $u_{BW_1}$ is a GCL sequence index for the first bandwidth, $N_{G,BW_1}$ is a GCL sequence length for the first bandwidth and M is a number of GCL sequences in the first subset.

15. The cellular communication system of claim 1 wherein the selection means is arranged to select the first GCL sequence from the first subset in response to a cell identity associated with the first base station.

16. The cellular communication system of claim 1 wherein the cellular communication system is an Orthogonal Frequency Division Multiplex OFDM system employing a fixed subcarrier bandwidth and different numbers of subcarriers for different bandwidths.

* * * * *